Feb. 17, 1953 A. R. PIATT 2,629,027
WINDING AND REELING MECHANISM FOR ELECTRICAL CABLES
Filed Nov. 15, 1945 4 Sheets-Sheet 1

Inventor
A. R. PIATT

Feb. 17, 1953  A. R. PIATT  2,629,027
WINDING AND REELING MECHANISM FOR ELECTRICAL CABLES
Filed Nov. 15, 1945  4 Sheets-Sheet 3

Inventor
A. R. PIATT
By Ralph L Chappell
Attorney

Patented Feb. 17, 1953

2,629,027

UNITED STATES PATENT OFFICE 2,629,027

WINDING AND REELING MECHANISM FOR ELECTRICAL CABLES

Alvin R. Piatt, Burbank, Calif.

Application November 15, 1945, Serial No. 628,951

13 Claims. (Cl. 191—12.2)

(Granted under Title 35, U. S. Code (1952), sec. 266)

This invention relates to a device for maintaining a continuous electrical connection between an electrical receiving apparatus and a cable which is intermittently wound and unwound to varying degrees on a winch. More specifically the invention relates to a winding and reeling mechanism for maintaining a continuous electrical connection of predetermined fixed resistance between an electrical cable wound on the drum of a winch and an electrical receiving apparatus as the cable is reeled in or unwound from the drum.

In devices of this general character heretofore devised in which an electrical cable is reeled or unreeled from the drum while an electrical connection is continuously established thereto, it has been the usual practice to employ a slip ring arrangement for maintaining an external electrical connection between the cable and the apparatus connected to the inner end of the cable which is secured to the drum. As is well known, a slip ring arrangement possesses the disadvantage of a variation in the resistance of the contact elements as the slip ring rotates, which may result from various causes such, for example, as dirt or corrosion at the contact surfaces or irregularities thereof.

The invention is well adapted to be employed in connection with the detection of masses of magnetic material submerged within a body of water by a detecting coil towed through the water in a submerged condition in which an electrical signal is generated by the coils as the coil moves into the vicinity of the mass and the electrical signal is employed to control the operation of an indicating device on board the towing vessel. The signal indication generated by the detector coil as the coils move into the vicinity of the submerged magnetic mass is of relatively weak intensity and it has been found necessary in detecting devices of this character to maintain a continuous electrical connection of fixed resistance between the detector coil and the receiving apparatus on the towing vessel in order that the signal received as the coil moves into proximate spaced relation with the submerged metallic mass may be properly identified and may distinguish from the "background" signals on the receiving apparatus. Such "background" may be caused by the variation in the angular position of the magnetic detector device with respect to the magnetic field due to changes in the towing velocity and also by the operation of electrical apparatus, such as motor-generator sets, on board the towing vessel.

The present invention employs an arrangement for maintaining a continuously interconnected electrical conductor between a magnetic detector device towed in a submerged condition through the water and electrical receiving apparatus on board the towing vessel which conductor is of fixed resistance and continuous and in which means may be employed to pay out or haul in, as the case may be, a length of cable connected to the detector device.

The arrangement of the present invention also is such as to make possible the storing of a constant length of the electrical conductor between the receiving apparatus and the aforesaid cable which carries a portion of the conductor throughout the length thereof. By reason of the arrangement for storing the conductor as the cable is payed out or hauled in during operation of the detecting system, fouling of the conductor is avoided and a compact arrangement is provided.

In surveying the bottom of a body of water for sunken vessels, mines, depth charges, torpedoes, or anchors, it is the common practice to draw through the water a magnetic detector device towed by a small vessel. Such devices operate on the well known principle that the earth's magnetic field is substantially constant in intensity over a given area but the presence of a large metallic mass will cause a concentration of the flux lines in the vicinity of the metallic mass and the detector device in passing from the uniform field into and out of the concentrated magnetic field will give out a signal. Such a magnetic detector device forms the subject matter of the co-pending application of E. N. Shawhan et al. for Submerged Body Detection System, Serial No. 489,726, filed June 4, 1943. In general a device of this type comprises a hydrofoil which is adapted to be towed through a body of water into proximity to a submerged body to be detected, the hydrofoil being provided with a primary winding energized from a source of alternating current and two secondary windings, one of which is more closely coupled with the primary winding than the other. The two secondary windings are differentially connected so that the electro-motive forces induced therein by the primary winding oppose each other and, these electro-motive forces being approximately equal, they will be substantially balanced. Because of the different coupling co-efficients between the respective secondary windings and the primary winding, the distorted magnetic field around the submerged metallic body will link both the secondary windings in a manner to produce additive electro-motive forces in the two windings.

The electro-motive forces or signals generated by the magnetic detector device are for all practical purposes in a steady state and as such would be ineffective to operate any kind of indicating or recording instrument. In order to make effective use of such signals they are put through a chopper or interrupter, which breaks up the signals into a pulsating electro-motive force, and through an A. C. amplifier, such as the chopper and amplifier disclosed and claimed in the copending application of Ernest R. Haberland et al., for Electronic Fluxmeter and A. C. Amplifier, Serial No. 624,620, filed October 25, 1945.

Another object of the present invention is to provide a winding and reeling mechanism of the type described which will derive its motive power from the winch.

Other objects, advantages, and improvements will become apparent from the following description, taken in connection with the accompanying drawings, in which:

Fig. 8 is a detail view, partly broken away, showing the upper double reels of the winding and reeling mechanism;

Fig. 9 is a detail view showing the lower compound reel of the winding and reeling mechanism; and, Fig. 10 is a sectional view taken substantially along the section line 10—10 of Fig. 3 through the lower compound reel of the winding and reeling mechanism.

Figure 1:
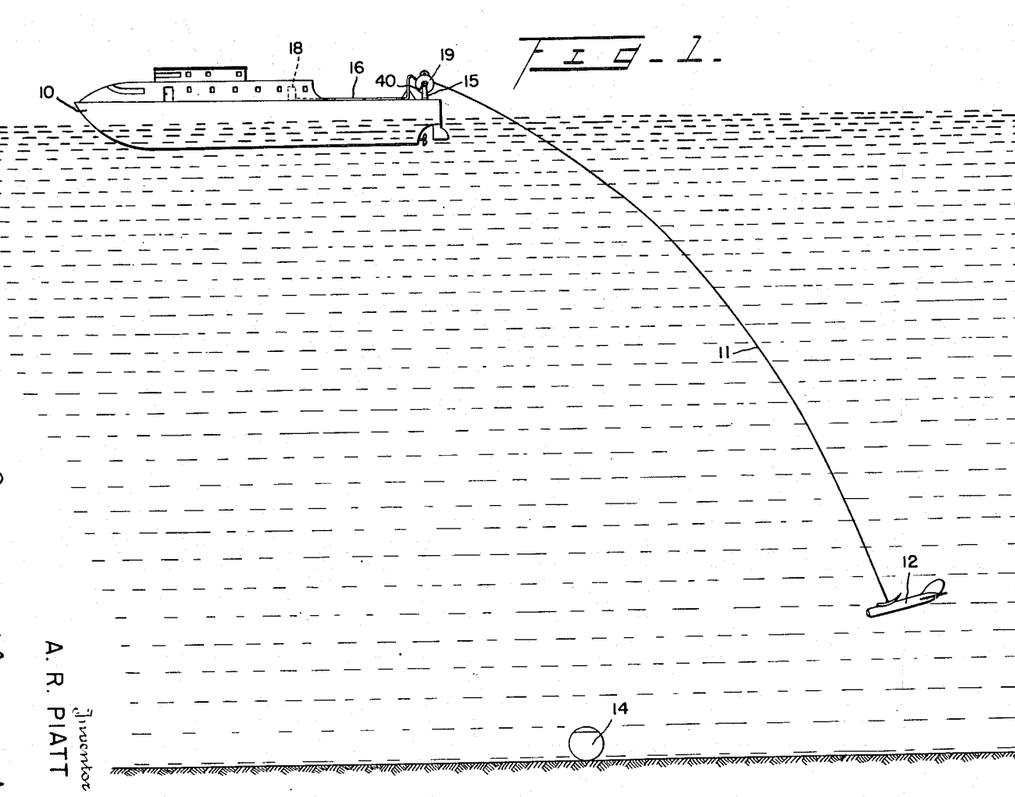
Fig. 1 is a view showing a small vessel, such as a motor boat or a trawler, towing a magnetic detector device in the proximity of a mine resting on the bed of a body of water.
Figure 2:
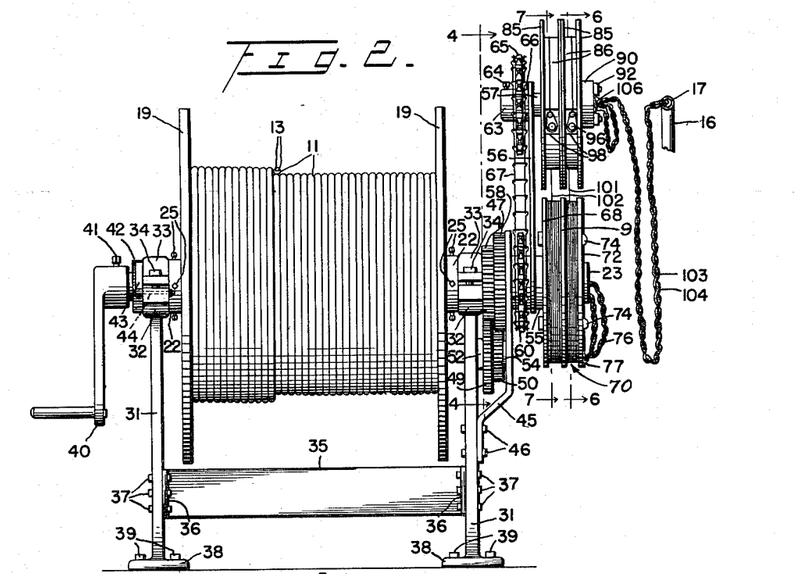
Fig. 2 is a side elevation view of the winch for the magnetic detector device in combination with the winding and reeling device of the present invention.
Figure 3:
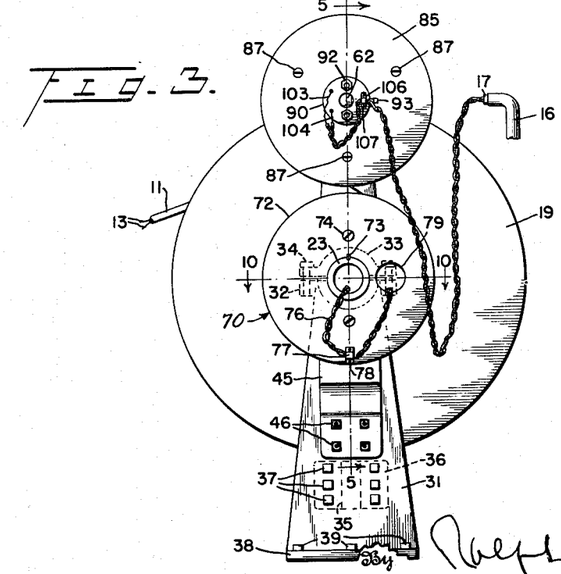
Fig. 3 is an end elevation of the structure and mechanism shown in Fig. 2.
Figure 5:
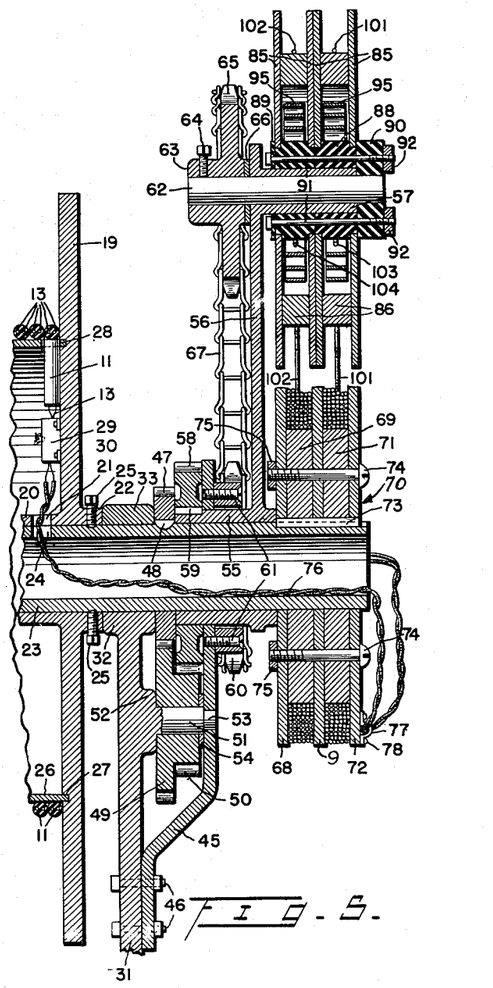
Fig. 5 is a view taken along the section line 5—5 of Fig. 3 showing in cross section the planetary drive.

Referring now to Fig. 1, there is shown thereon a vessel 10, such as a motor boat, which draws the magnetic detector device 12 through the water by a cable 11. The cable 11 is both a supporting and an electrical conductor cable, the cable having parallel electrical conductors 13—13 formed approximately centrally thereof, as best shown in Fig. 5. A mine 14 is shown resting on the bed of the body of water. The cable 11 is attached at its other end to the drum of a winch 15. A conduit 16, having a bushing 17 in the end thereof as shown in Fig. 2, extends from a point adjacent the winch to the interior of the cabin of the motor boat wherein there is mounted the receiving apparatus 18 comprising a chopper or interrupter, an A. C. amplifier, and an indicating or recording instrument.

As shown in Figs. 2 and 5 the principal part of the winch 15 is a drum on which the cable 11 is wound and from which it may be unwound, this drum comprising a pair of end plates 19—19 and a hub 26. Each end plate 19 has a central bore therethrough and integral internal and external bosses 20 and 22, respectively, formed concentrically with respect to the bore and through which the latter extends. A hollow shaft 23 projects through the central bores in the end plates 19—19 and is secured thereto by suitable set screws 25 extending through radially positioned holes on the external bosses 22—22. A radial hole 21 is provided in the internal boss 20 on the right end plate 19, Fig. 5, and an aligned hole 24 in the hollow shaft 23 in order to allow for the passage of two conductors 76—76, as will be later described. The hub 26 is formed as a hollow cylinder, on which the cable 11 is wound, this hub being secured in annular grooves 27—27 formed in the inner faces of the end plates 19—19. The inner end of the cable 11 is passed through a radial hole 28 in the cylindrical hub 26, which hole is positioned adjacent to the right end plate 19. The conductors 13—13 from the cable 11 are secured in a terminal block 29 which is mounted on the inner face of the right end plate 19, Fig. 5, by screws 30 and inside the hollow cylindrical hub 26.

The shaft 23 is supported by two parallel standards 31—31. Each of these standards has its upper end formed as a semi-cylindrical bearing boss 32, in which bosses the shaft 23 is rotatably mounted. Complementary semi-cylindrical upper bearing caps 33—33, which are held to the lower bearing bosses 32—32 by bolts 34, complete the bearing assemblies. The bearings 32—33 abut on their inner faces the external bosses 22—22 on the end plates 19—19 of the drum. A cross brace 35 is positioned below the drum and secured to the standards 31—31 by bolts 37, the cross brace having suitable toe flanges 36 through which the bolts 37 extend. Similarly, the standards 31—31 have toe flanges 38 at their bottoms through which flanges bolts or lag screws 39 extend to secure the standards to the deck of the boat 10.

At the left end (Fig. 2) of the shaft 23 a crank 40 is fitted thereon, this crank having a hollow central hub into which the shaft fits. A radially positioned set screw 41 extends through a suitable threaded hole in the hub to secure the crank to the shaft. A ratchet gear 42 is secured to the shaft 23 in any suitable manner, as by a key (not shown), intermediate the hub of the crank 40 and the left (Fig. 2) bearing 32—33 and abutting the latter. A pawl 43 is secured to the lower semi-cylindrical bearing boss 32 by a bolt 44 passing through a suitable hole in the latter and this pawl engages the ratchet gear 42 to prevent reverse rotation of the latter and the drum 19 secured to the shaft 23 while the magnetic detector device is being towed through the water.

A bracket 45 is attached to the right standard 31, Figs. 2 and 5, by bolts 46, this bracket having a lower portion through which the bolts 46 pass, an intermediate offset portion, and an upper bearing portion, parallel to the lower portion and the standard 31 and which encompasses the shaft 23. Mounted on the shaft 23 and secured thereto by a key 48, there is a spur pinion 47, this pinion abutting on its inner face the bearing 32—33 on the right standard 31. Rotatably mounted on a stub shaft 51, which is integral at its inner end with a boss 52 on the right standard 31 and at its outer end has a reduced section 53 which extends into a suitable hole in the bracket 45, there is a compound gear 49—50 comprising a driven gear 49, which is in mesh with the spur pinion 47, and a driving pinion 50 of lesser diameter. Interposed between the outer face of the pinion 50 and the bearing bracket 45 there is a washer 54. The spur pinion 47 and the driven gear 49 have the same diameter and number of teeth, that is the driving ratio between these gears is 1:1.

A radial arm 56 has its hub formed as a sleeve 55 which latter is rotatably mounted on the shaft 23 with its inner end abutting the spur pinion 47. Mounted on the hub 55 and secured thereto by a key 59 there is a spur gear 58, this gear abutting the spur pinion 47 on its inner face and the bracket 45 on its outer face and being in mesh with the driving pinion 50 of the compound gear 49—50. The driving pinion 50 is one half the diameter and has one half the number of teeth of the spur gear 58, that is the driving ratio between these gears is 1:2.

Figure 4:
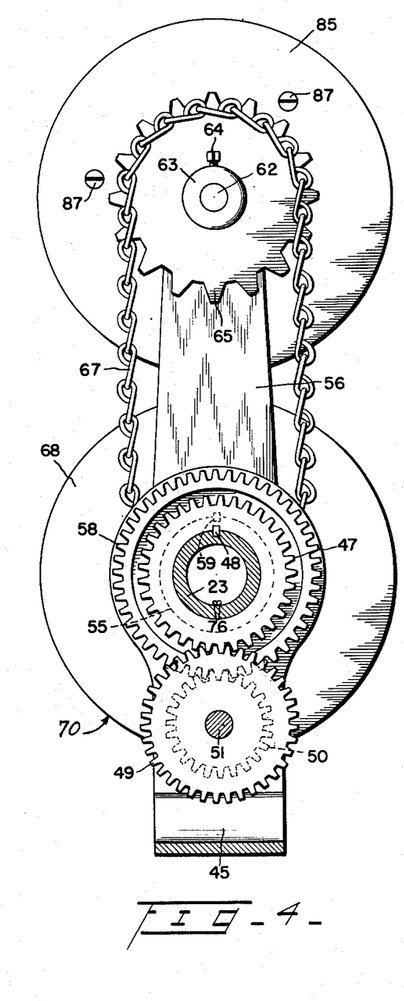
Fig. 4 is a view taken along the section line 4—4 of Fig. 2 showing in detail the planetary drive which rotates the planet reels of the winding and reeling device.

Mounted on the upper end of the bracket 45 by screws 61 there is a sun sprocket 60 through which the sleeve 55 freely passes. The radial arm 56 has an integral hollow boss 57 adjacent its outer end through which the stub shaft 62 freely extends. On the inner end of the stub shaft 62 there is mounted a planet sprocket 65, this sprocket having a concentric hub 63 through which a radially positioned set screw 64 projects to secure the hub to the stub shaft. Interposed between the outer face of the hub 63 of the planet sprocket 65 and the radial arm 56 there is a washer 66. The sun sprocket 60 and the planet sprocket 65 have the same diameter and the same number of teeth and they are connected by a chain drive 67.

A compound reel 70 is secured on the outer end of the shaft 23 by a key 73. This reel comprises two end discs 68 and 72 and an intermediate disc 9, the end discs functioning as retainer members and the intermediate disc as a separator member for two coils of conductors 101 and 102, respectively, as will later be described. Hub discs 69 and 71 are interposed between the innermost end disc 68 and the intermediate disc 9, and between the intermediate disc and the outermost end disc 72, respectively. The innermost end disc 68 is in abutting engagement with the hub 55 of the radial arm 56. The five (5) discs are held together in a unitary structure by screws 74 passing through aligned holes in the discs and having nuts 75 on their outer ends. The discs are preferably made of one of the well known phenolic condensation products for insulation purposes and all have aligned equi-diameter holes therethrough for receiving the shaft 23 and aligned slots for receiving the key 73.

A pair of conductors 76—76 extends from the terminal block 29 through the aligned holes 21 in the internal flange 20 on the right end plate 19 of the drum, Fig. 5, and 24 in the hollow shaft 23, respectively, and outwardly of the shaft. Inside the terminal block 29 each of the conductors 76—76 is joined to one of the conductors 13—13 from the cable 11. The conductors 76—76 are secured to the outermost end disc 72 of the compound reel 70 by a clip 77, this clip being attached to the end disc adjacent the periphery of the latter by screws 78. The conductors 76—76 pass inwardly through a radially spaced hole 79, which hole extends through the outermost end disc 72, the hub disc 71, the intermediate disc 9, and the hub disc 69; the conductors pass outwardly through radially positioned holes 80—80 in the hub discs 69 and 71, respectively, and terminate in recesses 81—81 in the outer peripheries of the hub discs, respectively. In these recesses the ends of the conductors are secured, as by soldering, in contact clips 82—82, the conductors passing through holes 83—83, respectively, in one end of each of these clips. The contact clips 82—82 are secured to the hub discs 69 and 71, respectively, at the bottoms of the recesses 81—81, respectively, by screws 84.

Figures 8, 9, 10:
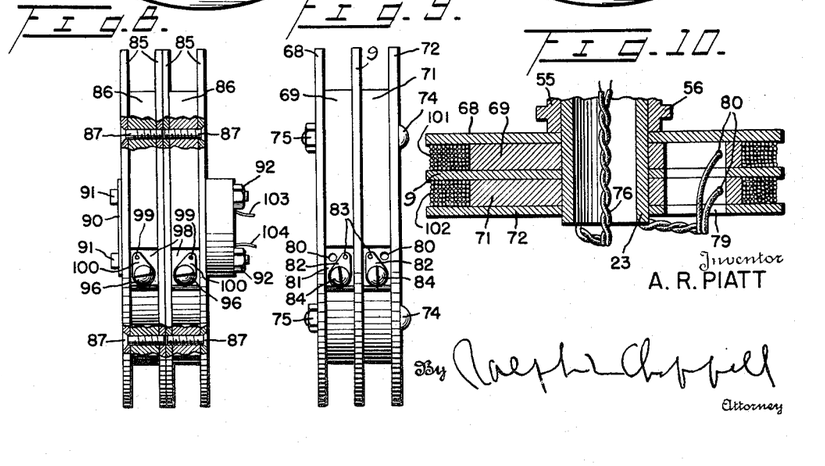

Two parallel reels are rotatably mounted on the hollow boss 57 on the radial arm 56 and aligned with the sections 69 and 71, respectively, of the compound reel on the shaft 23. These reels each consist of a pair of parallel end discs 85—85 with an intermediate ring 86 forming a hub interposed between the end discs. Screws 87 pass through each pair of end discs 85—85 and the respective hub 86 to hold same in integral relationship. Again the two sets of end discs 85—85 and the hubs 86 are preferably made of one of the well known phenolic condensation products for insulation purposes. The reels 86—86 are journaled on two aligned bushings 88—88, which in turn are mounted on the hollow boss 57 on the radial arm 56. The four end discs 85 each have axial equi-diameter holes therethrough and each bearing bushing 88 has a circumferential shoulder on both of its outer corners on which shoulders the end discs 85—85 are received. A circular plate 89 is mounted on the outer face of the innermost end disc 85, this plate having a central aperture to fit over the boss 57 on the radial arm 56 and the external diameter of the plate being the same or larger than that of the bearing bushings 88—88. Similarly, a retainer disc 90 is mounted on the outer face of the outermost end disc 85, this retainer disc having a central aperture through which the stub shaft 62 passes and the external diameter of the disc likewise being the same or larger than that of the bearing bushings 88. Retaining bolts 91 pass through aligned holes in the circular plate 89, the bearing bushings 88—88, and the retainer disc 90 and these bolts have nuts 92 on their outer ends to secure the plate, bearing bushings, and the disc in integral relationship. The bearing bushings 88—88, circular plate 89, and the retainer disc 90 are all made of some insulating material such as hard rubber or again of one of the well known phenolic condensation products. The central aperture through the retainer disc 90 is large enough to accommodate the stub shaft 62 but not the boss 57 on the radial arm 56 and hence this disc is in abutting engagement with the boss and the latter prevents inward movement of the circular plate 89, bearing bushings 88—88, and the retainer disc 90. The retainer disc 90, and consequently the bearing bushings 88—88 and the circular plate 89, are secured to the stub shaft 62 by a set screw 93 which is fitted in a suitably threaded radial hole in the retainer disc and engages a flat surface on the stub shaft.

As previously stated, the end discs 85—85 of each of the reels are freely journalled on the insulating bearing bushings 88—88, respectively. Each hub 86 of the reels is attached to the respective bearing bushing 88 by a spiral spring 95, which is positioned inside the hub and generally concentrically with respect to the stub shaft 62, hollow boss 57, and the bearing bushing 88, these springs functioning both as tensioning or take-up means and as electrical conductors, as will be later described in greater detail. The outer ends of the springs 95—95 are attached to screws 96—96 which project radially inwardly through the hubs 86—86, respectively, being held thereon by nuts 97—97; the heads of the screws 96—96 repose in recesses 98—98 in the peripheries of the hubs 86—86. Contact clips 100—100 are positioned under the heads of the screws 96—96, these clips having holes 99—99 in one end for the reception of conductors 101 and 102, respectively, as will be later described. Similarly, the inner ends of the springs 95—95 are attached by screws 94—94 to the peripheries of the insulating bearing bushings 88—88, respectively.

Figure 6:
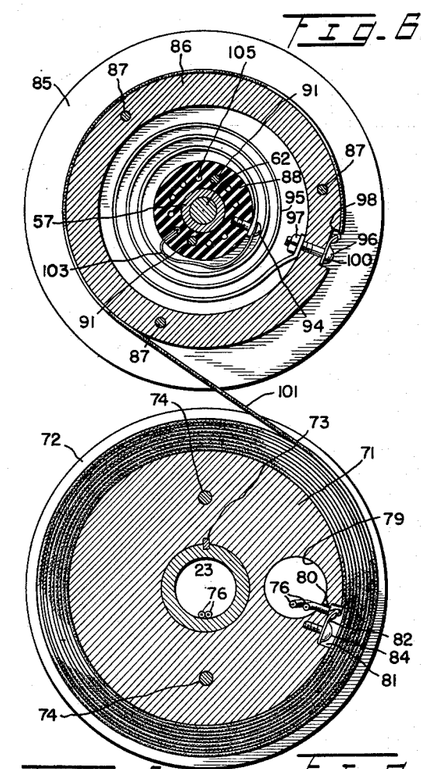
Fig. 6 is a view taken along the section line 6—6 of Fig. 2 showing one pair of the reels of the winding and reeling mechanism.
Figure 7:
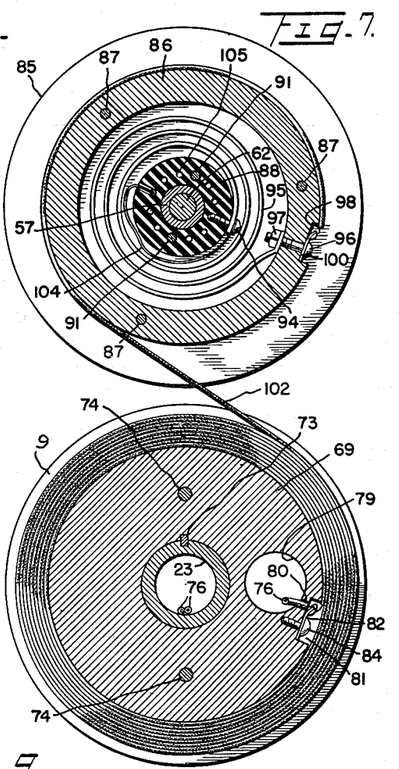
Fig. 7 is a view taken along the section line 7—7 of Fig. 2 showing the other pair of reels of the winding and reeling mechanism.

A conductor 101 is wound counter-clockwise on the right reel 86, Figs. 2 and 5, and clockwise on the right section or hub 71 of the compound reel 70, as shown in Fig. 6. The inner end of the conductor 101 is attached to the contact clip 82 in the recess 81 of the hub 71 of the right section of the compound reel 70 and the outer end to the contact clip 100 in the recess 98 of the hub 86 of the right reel. Similarly, a conductor 102 is wound counter-clockwise on the left reel 86, again Figs. 2 and 5, and clockwise on the left section or hub 69 of the compound reel 70, as shown in Fig. 7. Likewise, the inner end of the conductor 102 is attached to the contact clip 82 in the recess 81 of the hub 69 of the left section of the compound reel and the outer end to the contact clip 100 in the hub 86 of the right reel.

A conductor 103, this being one of a twisted pair, is connected at its inner end to the spiral spring 95 and screw 94 in the insulating bearing bushing 88 of the right reel, Figs. 2 and 5, and this conductor extends through a longitudinal bore 105 in the insulating bearing bushing 88 beyond the outermost end disc 85; similarly, a conductor 104, the other of the twisted pair, is connected at its inner end to the spiral spring 95 and the screw 94 in the insulating bearing bushing 88 of the left reel 86, again Figs. 2 and 5, and extends through another longitudinal bore 105 in the insulating bearing bushing 88 beyond the outermost end disc 85. The pair of conductors 103—104 is secured to the retainer disc 90 by a clip 106 which is fastened to the retainer disc adjacent to the periphery of the latter by screws 107. From the outer or right reel 86 the pair of conductors 103—104 extends to the conduit 16, entering this conduit to the receiver or recorder 18 inside the cabin of the motor boat 10. The outer end of the conduit 16 is positioned adjacent to the reels 86—86, when the latter are in their uppermost position, and aligned with the circle of rotation of these reels around the shaft 23.

While the invention has been described in connection with a two (2) conductor transmission system, it should be obvious that as many conductors 13 may be included within the cable 11 between the magnetic detector device 12 and the receiver or recorder 18 as may be desired. In such case there will be as many sections of the compound reel 70 and as many individual reels 86 as there are conductors. The insulating bearing bushing 88 of the outermost or right reel 86, Figs. 2 and 5, will then have as many longitudinal bores 105 therethrough as there will be conductors. It is for this reason that a multiplicity of such bores is shown in Fig. 6. If desired, each insulating bearing bushing 88 of the succeeding reels 86 progressing inwardly may have one less longitudinal bore 105 but for convenience of manufacture the same number of bores will probably be provided in all of the bearing bushings.

The operation of the winding and reeling mechanism of the present invention should be apparent from the preceding description. It may, however, be briefly summarized as follows: The magnetic detector device is payed out from the drum 19 by revolving the crank in the proper direction while the pawl 43 is disengaged from the ratchet gear 42 and as the motor boat 10 proceeds through the water it tows the magnetic detector device 12 behind in a submerged condition. The latter device in passing through the undisturbed earth's magnetic field will generate an electromotive force, due to the relative motion of the device and the magnetic field. This electro-motive force will be registered on the receiving or recording apparatus 18 in the cabin of the motor boat 10, this effect becoming part of the "background" of the apparatus. Should the magnetic detector device 12 pass in the vicinity of a submerged metallic mass, such as an anchor, depth charge, sunken vessel, or a torpedo, or the mine 14, as shown, the detector device in approaching, passing through, and receding from the magnetic field of increased intensity caused by the presence of the magnetic mass will develop variable signals which will be indicated by the receiving or recording apparatus 18.

As the motor boat 10 accelerates, or passes into deeper water, it will be necessary to pay out the cable 11 from the winch 15; conversely, as the motor boat 10 decelerates, stops, or backs up, or enters shallower water, it will be necessary to take in the cable 11. The cable 11 is payed out or taken in by rotating the drum 19 of the winch 15 by the hand crank 40. The mechanism of the present invention invariably maintains in compact relationship the conductors 101—102 between the cable 11 on the drum 19 and the conduit 16 as the cable is payed out or taken in, as the case may be.

The rotation of the drum 19 and the shaft 23 to pay out or take in the cable 11 also rotates the spur pinion 47 which is fixed to the shaft 23. Spur gear 49, being in mesh with the pinion 47, is likewise rotated. As previously stated, the spur pinion 47 and the spur gear 49 have the same diameter and the same number of teeth and consequently no angular velocity change is accomplished here, only a change in the direction of rotation. The spur pinion 50, being integral with the spur gear 49, obviously rotates at the same angular velocity and in the same direction as the latter. Also, as previously stated, the spur pinion 50 has half the diameter and number of teeth as the spur gear 58 with which it meshes. There is therefore again a reversal in direction of rotation and also a reduction of one half in angular velocity of the spur gear 58 with respect to the driving spur pinion 50. The sleeve 55 and the radial arm 56, the spur gear 58 being keyed to the former, will therefore be rotated in the same direction and at half of the angular velocity of the shaft 23, driving pinion 47, and the compound reel 70. Again, as previously stated, the sun sprocket 60 and the planet sprocket 65 on the stub shaft 62 have the same diameter and the same number of teeth and there is, therefore, no multiplying or reduction ratio here. Due to this 1:1 ratio between the sun sprocket 60 and the planet sprocket 65, only substantially translatory movement of the reels 86—86 is produced as the radial arm 56 is rotated through one revolution. These reels, however, move through one revolution relative to the radial arm 56 but in the opposite direction. The compound reel 70 is rotated in the same direction as the arm 56 and therefore tends to receive or release the conductors 101 and 102 released by or supplied to, respectively, the reels 86—86, depending on the direction of rotation of the shaft 23 and the compound reel 70, as the reels 86—86 rotate relative to the radial arm 56 and in the direction opposite to the direction of rotation of the compound reel 70. Since the reels 86—86 make one revolution about the compound reel 70 during translatory movement thereof with each revolution of the arm 56, the compound reel 70 must make two (2) revolutions for each revolution of the reels 86—86 relative to the radial arm 56 in order that the conductors 101—102 between the compound reel 70 and the reels 86—86 will be invariably maintained in taut relationship. As previously stated, this relative rotation of the compound reel 70 with respect to the radial arm 56 is produced by the 1:2 reduction ratio between the driving pinion 50 and the spur gear 58 on the hub 55 of the radial arm 56.

In winding the conductors 101 and 102 on the compound reel 70 they may pile up in layers of different diameters on the two sections 69 and 71 of this reel and, conversely, in unwinding same from the two sections of the compound reel they may be drawn from layers of different diameters on the two sections. The tangential velocities of the conductor 101 on the section 71 and the conductor 102 on the section 69 of the compound reel would then be different although the angular velocities of the two sections of the compound reel would necessarily be the same. Also, if less than half of the total lengths of the conductors 101 and 102 are on the sections 69 and 71 of the compound reel 70, or, conversely, if less than half of the total lengths of these conductors is on the reels 86—86, the tangential velocities of the conductors being wound on the sections of the compound reel and unwound from the reels 86—86, or conversely, will be different. Further it is the case that the tangential velocities of winding the conductor 101 on the section 71 and the conductor 102 on the section 69 of the compound reel, or the tangential velocities of unwinding these conductors from these sections, respectively, will be different for different positions of the reels 86—86 around the compound reel 70 as the radial arm 56 goes through a revolution. It is for these reasons that individual reels 86—86 are provided on the stub shaft 62 for the two conductors 101 and 102, respectively, and individual tensioning springs 95—95 intermediate the reels 86—86 and the insulating bearing bushings 88—88, respectively, the springs 95—95 operating as take-up means for continuously maintaining the conductors 101 and 102 in taut relationship between the reels 86—86 and the compound reel 70.

While there is here shown and described a certain preferred embodiment of the invention, many other and varied forms and uses will present themselves to those versed in the art without departing from the spirit of the invention, and the invention, therefore, is not limited either in structure or in use except as indicated by the terms and scope of the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In an electrical system of the character disclosed, the combination of a pair of electrical devices adapted to be spaced variably relative to each other, means comprising an electrical conductor between said electrical devices, first and second reels having a portion of said conductor trained therebetween and having variable lengths of said portion of the conductor wound thereabout selectively as the electrical devices are spaced variably relative to each other, means for rotating said first reel about its axis of rotation in either direction selectively as the electrical devices are moved relatively toward or away from each other, and means for producing substantially translatory movement of said second reel about the axis of the first reel in the same direction therewith and at one half the speed of rotation thereof as the first reel rotates.

2. In a winding and reeling mechanism of the character disclosed for maintaining a continuous and flexible connection between a pair of devices, one of which is adapted to be spaced variably from the other as the connection is payed out from or hauled in on a rotating member, the combination of first and second reels having a portion of said flexible connection trained therebetween and having variable lengths of said portion of the connection wound thereabout and transferred therebetween selectively as the pair of devices are spaced variably relative to each other, means for rotating said first reel about its axis of rotation in either direction selectively as the pair of devices are moved toward or away from each other, and means for producing substantially translatory movement of said second reel about the axis of the first reel in the same direction therewith and at one-half the speed of rotation thereof as the first reel rotates.

3. In a winding and reeling mechanism of the character disclosed for maintaining a continuous and flexible connection between a pair of devices, one of which is adapted to be spaced variably from the other as the connection is payed out from or hauled in on a rotating member, the combination of first and second reels having a portion of said flexible connection trained therebetween and having variable lengths of said portion of the connection wound thereabout and transferred therebetween selectively as the pair of devices are spaced variably relative to each other, means for rotating said first reel about its axis of rotation in either direction selectively as the pair of devices are moved toward or away from each other, means for producing substantially translatory movement of said second reel about the axis of the first reel in the same direction therewith and at one-half the speed of rotation thereof as the first reel rotates, and yieldable means for providing restrained rotation of the second reel about its axis of rotation to compensate for variations in the diameters of the convolutions of the flexible connection about the first and second reels as variable lengths of the connection are transferred therebetween.

4. In a winding and reeling mechanism of the character disclosed for maintaining a continuous and flexible electrical conductor between a pair of electrical devices, one of which is adapted to be spaced variably relative to the other as the conductor selectively is payed out from or hauled in on a rotating member, the combination of a shaft secured to said rotating member for rotation therewith, an arm mounted for rotation about the shaft, a reel mounted on the shaft for rotation therewith, a complementary reel mounted on the arm and aligned with the reel on the shaft, said reels having a portion of the flexible conductor trained therebetween and variable lengths of said conductor which may be wound thereabout and transferred therebetween selectively as the spaced relation between said devices is varied, means for rotating the arm in the same direction and at half the angular velocity of the shaft, and planetary gearing means for rotating the complementary reel through one revolution relative to the arm for each revolution thereof and in the reverse direction thereto.

5. An electrical cable winding and reeling mechanism adapted to be mounted on the rotating main shaft of a winch comprising reels mounted on the shaft for rotation therewith, an arm mounted on the shaft for rotation thereon, means for rotating the arm in the same direction and at half the angular velocity of the shaft, complementary reels mounted on the arm and aligned with the reels on the shaft, planetary gearing for rotating the complementary reels through one revolution relative to the arm for each revolution of the arm and in the reverse direction thereto, each of said reels and its aligned complementary reel being adapted to have coiled thereon one of the electrical conductors included in the electrical cable, and electrical outlet means on said complementary reels for their respective conductors.

6. An electrical cable winding and reeling mechanism adapted to be mounted on the rotating main shaft of a winch comprising, reels mounted on the main shaft for rotation therewith, an arm mounted for rotation on the main shaft, means for rotating said arm in the same direction and at half the angular velocity of the shaft, an auxiliary shaft rotatably carried by the arm, complementary reels mounted on the auxiliary shaft for rotation therewith and aligned with the reels mounted on the main shaft, a fixed sun member surrounding the main shaft, a planetary member mounted on said auxiliary shaft for rotation therewith, a transmission between the sun and the planetary members adapted to drive the planetary member through one revolution relative to the arm for each revolution of the arm and in the reverse direction thereto, each of said reels and its aligned complementary reel being adapted to have coiled thereon one of the electrical conductors included in the electrical cable, and electrical outlet means on said complementary reels for their respective conductors.

7. An electrical cable winding and reeling mechanism adapted to be mounted on the rotating main shaft of a winch comprising, reels mounted on the main shaft for rotation therewith, an arm mounted for rotation on the main shaft, gearing between the main shaft and the arm comprising a double direction change and a 1:2 driving ratio whereby the arm is rotated in the same direction and at half the angular velocity of the main shaft, an auxiliary shaft carried by the arm for rotation with respect thereto, complementary reels mounted for rotation on the auxiliary shaft and aligned with the reels on the main shaft, means providing a yieldable driving connection between the auxiliary shaft and the complementary reels, a fixed sun sprocket wheel surrounding the main shaft, a planetary sprocket wheel mounted on said auxiliary shaft for rotation therewith, a chain drive between the sun and the planetary sprocket wheels for rotating the planetary member relative to the arm one revolution for each revolution of the arm and in the reverse direction thereto, each of said reels and its aligned complementary reel being adapted to have coiled thereon one of the electrical conductors included in the electrical cable, and electrical outlet means on said complementary reels for their respective conductors.

8. In a winding and reeling means for a cable having an electrical conductor therein, a rotatable shaft, a drum upon which said cable is wound mounted on the shaft for rotation therewith, a reel mounted on said shaft for rotation therewith, an arm mounted for rotation about the shaft, means for rotating said arm in the same direction and at half the angular velocity of the shaft, a complementary reel rotatably mounted on the arm in alignment with the reel on the shaft, means for rotating the complementary reel through one revolution relative to the arm for each revolution thereof and in the reverse direction thereto, and electrical conducting means connected to said cable conductor including a wire which is coiled on said reel in one direction and then reversely coiled on the complementary reel whereby varying portions of said wire is selectively wound on one or the other of said reels as the cable is payed out or hauled in.

9. In a winding and reeling means for a cable having a plurality of electrical conductors therein, a rotatable shaft, a drum upon which said cable is wound mounted on the shaft for rotation therewith, a plurality of reels mounted on the shaft for rotation therewith, an arm mounted for rotation about the shaft, means for rotating said arm in the same direction and at half the angular velocity of the shaft, a plurality of complementary reels rotatably mounted on the arm in alignment with their respective reels on said shaft, means for rotating the complementary reels through one revolution relative to the arm for each revolution thereof and in the reverse direction thereto, and electrical conducting means connected to said cable conductors including a plurality of wires which are coiled on their respective reels and then reversely coiled on the complementary reels thereto whereby varying portions of said wires are selectively wound on one or the other of said reels as the cable is payed out or hauled in.

10. In an electrical system of the character disclosed, the combination of an electrical conductor having a wire portion integral therewith, means including a rotatable drum for selectively paying out or hauling in one end of said conductor, a winding mechanism driven by said drum including a reel mounted for rotation with said drum, arm means mounted for rotation by said drum in the same direction as said drum and at half the angular velocity thereof, a planetary reel mounted on said arm in alignment with said reel, means for rotating said planetary reel in reverse direction to said first mentioned reel and at half the angular velocity thereof, said wire portion being coiled on the first mentioned reel in one direction and then reversely coiled on the planetary reel whereby varying portions of said wire is selectively wound on one or the other of said reels as the cable is payed out or hauled in.

11. In a device in accordance with claim 8 and including yieldable means for providing restrained rotation of the second reel about its axis of rotation to compensate for variations in the diameters of the wire about the first and second reels as variable lengths of the wire are transferred therebetween.

12. A reeling device for an elongated flexible member comprising a rotatable shaft, a drum mounted on the shaft for rotation therewith, a portion of the elongated flexible member being removably wound on said drum, a reel mounted on said shaft for rotation therewith, an arm rotatably mounted on said shaft, means for rotating said arm in the same direction as said reel and at half the angular velocity, a complementary reel rotatably mounted on said arm, means for rotating said complementary reel through one revolution relative to the arm for each revolution of the arm and in the reverse direction thereto thereby to produce translatory movement of the complementary reel about the axis of the first mentioned reel, a portion of said flexible member being coiled on the first mentioned reel in one direction and on the complementary reel in the opposite direction whereby a substantially constant length of said flexible member is transferred selectively between said reels as the flexible member is hauled in or payed out from said drum.

13. A device in accordance with claim 12 and including resilient means so constructed and arranged as to provide restrained rotation of the second reel about its axis of rotation to compensate for variations in the diameters of the convolutions of the flexible member about the reels as variable lengths are transferred therebetween.

ALVIN R. PIATT.

REFERENCES CITED

The following references are of record in the file of this patent:

UNITED STATES PATENTS

| Number | Name | Date |
| --- | --- | --- |
| 1,322,407 | Chegwidden et al. | Nov. 18, 1919 |

FOREIGN PATENTS

| Number | Country | Date |
| --- | --- | --- |
| 50,547 | Sweden | Dec. 28, 1921 |